United States Patent
Jahangir et al.

(10) Patent No.: US 6,801,155 B2
(45) Date of Patent: Oct. 5, 2004

(54) METHOD AND APPARATUS FOR RECOGNISING A RADAR TARGET

(75) Inventors: Mohammed Jahangir, Worcs (GB); Keith M Ponting, Worcs (GB)

(73) Assignee: QinetiQ Limited, Farnborough (GB)

( * ) Notice: Subject to any disclaimer, the term of this patent is extended or adjusted under 35 U.S.C. 154(b) by 16 days.

(21) Appl. No.: 10/333,630

(22) PCT Filed: Jul. 23, 2001

(86) PCT No.: PCT/GB01/03279
§ 371 (c)(1),
(2), (4) Date: Jan. 23, 2003

(87) PCT Pub. No.: WO02/08783
PCT Pub. Date: Jan. 31, 2002

(65) Prior Publication Data
US 2003/0164792 A1 Sep. 4, 2003

(30) Foreign Application Priority Data
Jul. 24, 2000 (GB) .............................. 0017989

(51) Int. Cl.$^7$ ............................ G01S 7/292; G01S 7/41
(52) U.S. Cl. ............................ 342/90; 342/98; 342/99; 342/189; 342/192; 342/194; 342/196
(58) Field of Search ............................ 342/90, 98, 99, 342/160, 162, 189, 192, 194, 195, 196

(56) References Cited

U.S. PATENT DOCUMENTS

| | | | | |
|---|---|---|---|---|
| 5,640,468 A | * | 6/1997 | Hsu ............................ | 382/190 |
| 6,130,639 A | * | 10/2000 | Agnesina et al. ............ | 342/169 |
| 6,583,751 B1 | * | 6/2003 | Ferretti et al. ................ | 342/25 |
| 2003/0085831 A1 | * | 5/2003 | Lavoie ........................ | 342/13 |
| 2003/0164792 A1 | * | 9/2003 | Jahangir et al. .............. | 342/90 |

FOREIGN PATENT DOCUMENTS

DE 195 49 722 A 5/1997

OTHER PUBLICATIONS

"Hidden Markov modelling for SAR automatic target recognition", Nilubol, C.; Pharm, Q.H.; Mersereau, R.M.; Smith, M.J.T.; Clements, M.A.; ICASSP '98, vol.: 2, May 12–15, 1998 Ps: 1061–1064.*

"Multi–aspect target classification using hidden Markov models for data fusion", Runkle, P.; Carin, L.; Lam Nguyen; IGARSS 2000. vol: 5, Jul. 24–28, 2000 Ps: 2123–2125.*

"Radar target recognition based on peak location of HRR profile and HMMs classifiers", Bingnan Pei; Zheng Bao; RADAR 2002 Oct. 15–17, 2002 Page(s): 414–418.*

(List continued on next page.)

Primary Examiner—John B. Sotomayor
(74) Attorney, Agent, or Firm—Nixon & Vanderhye P.C.

(57) ABSTRACT

A method of recognizing a radar target comprises producing a sequence of Doppler spectra of radar returns form a scene and producing therefrom a sequence of Doppler feature vectors for a target in the scene. Hidden Markov modelling (HMM) is then used to identify the sequence of Doppler feature vectors as indicating a member of a particular class of targets. HMM is used to identify the sequence of Doppler feature vectors by assigning to each feature vector an occurrence probability by selecting a probability distribution or state from a set thereof associated with a class of targets, multiplying the occurrence probabilities together to obtain an overall probability, repeating for other probability distributions in the set to determine a combination of probability distributions giving highest overall probability for that class of target, then repeating for at least one other class of targets and selecting the target class as being that which yields the highest overall occurrence probability.

14 Claims, 7 Drawing Sheets

OTHER PUBLICATIONS

"Markov modeling of transient scattering and its application in multi–aspect target classification", Dong, Y.; Runkle, P.; Carin, L. (ICASSP '01). May 7–11, 2001 Ps: 2841–2844 vol. 5.*

Nandagopal et al.; "Performance of Radar Target Recognition Schemes Using Neural Networks—A Comparative Study"; *Acoustics Speech, and Signal Processing;* 1994; *IEEE International Conference on Adelaide;* SA, Australia; Apr. 19–22, 1994; pp. II–641 to II–644; (XP010133782).

Gaunard et al.; "Automatic Classification of Environmental Noise Events by Hidden Markov Models"; *Acoustics, Speech and Signal Processing;* 1998; *Proceedings of the 1998 IEEE International Conference;* Seattle, WA; May 12–15, 1998; pp 3609–3612; (XP010279579).

Mackenzie, J.D. et al.; "Wide–Bandwidth Mobile Radar for ISAR/SAR Radar Imaging", *IEEE Colloquium on Radar and Microwave Imaging;* London, UK; Nov. 16, 1994; pp 6/1–6 (XP002182074).

Zyweck, A. et al.; "Radar Target Classification of Commercial Aircraft"; *IEEE Transactions on Aerospace and Electronic Systems;* Apr. 1996; vol. 32, No. 2; pp 598–606; (XP002182073).

Hunt et al.; "An Investigation of PLP and IMELDA Acoustic Representations and of Their Potential for Combination"; *Speech Processing 2, VLSI, Underwater Signal Processing;* Toronto; May 14–17, 1991; *International Conference on Acoustics, Speech 7 Signal Processing;* New York; vol. 2; Apr. 14, 1991; pp 881–884 (XP010043113).

* cited by examiner

METHOD AND APPARATUS FOR RECOGNISING A RADAR TARGET

This application is the US national phase of International Application No. PCT/GB01/03279, filed 23 Jul. 2001, which designated the U.S., the entire content of which is hereby incorporated by reference.

BACKGROUND OF THE INVENTION

1. Field of the Invention

This invention relates to a method of and an apparatus for recognising a radar target.

2. Discussion of Prior Art

Moving target identification (MTI) radars are known. Such radars can provide all-weather, day and night surveillance capability and have a wide-area search capability as a result of rapid scanning of the radar beam. An MTI radar may be used to provide location information relating to a moving target and may also be used to identify a target as belonging to a particular class of targets. For example an MTI radar may be used to classify a target as being a person, a wheeled vehicle or a tracked vehicle. Presently, the task of target recognition using an MTI radar is carried out by a human operator. In one known MTI radar, echo signals from targets are converted to audio signals which are output to an audio speaker. To identify a particular target, the radar's antenna is directed to a target for several seconds during which time an operator listens to the audio speaker output. An operator requires training to develop the ability to classify targets from their corresponding audio frequencies. However, if a scene under observation contains many different types of targets, a human operator, however trained, cannot classify all types in the scene and cannot provide up-to-date information on a rapidly changing scene.

In the case of imaging radars, to perform target recognition on radar signals algorithms have been developed which rely on the availability of 2-dimensional high-resolution imagery of targets. They exploit the differences between spatial structures of radar images in order to classify targets. They are unfortunately unsuitable for use with MTI radars which are mainly low resolution sensors: MTI radars show target images as single bright point objects with no spatial structure in either range or azimuth.

There are certain circumstances in which an MTI radar can achieve better spatial resolution. If the radar operates at higher bandwidth then the radar signature will have a higher slant range resolution and the target will be resolved in range, e.g. a bandwidth of 500 MHz will give a slant range resolution of 0.3 m. However, it is not possible to get higher azimuth resolution. This is because imaging radars use a synthetic aperture radar (SAR) processing, which provides an azimuth resolution that is many times smaller than the real beam azimuth aperture.

SAR processing assumes a static scene and moving objects will not be focused in azimuth using it. Thus at best an MTI radar can only obtain 1-dimensional high range resolution profiles of moving targets. Limited success has been achieved in developing recognition algorithms that exploit the 1-dimensional high range resolution profile of targets for classification. A technique based on 1-dimensional range profile template matching is described in the Proceedings of the International Radar Symposium IRS-98. There are, however, two main drawbacks with a range profile classifier. Firstly, high bandwidth radars are more expensive and it is more difficult to extract high range resolution profiles because moving targets can migrate through a succession of range cells and causing considerable difficulties. Secondly, target range profiles are very sensitive to changes in target orientation to the radar and the target physical build characteristics.

Since a target can have any number of articulations, a range of build variations and an almost infinite number of external fitting configurations, the number of potential independent realisations of range profiles of a particular target is large. This presents a major problem for classifiers using template matching, because they carry out recognition by comparing the range profile of an unknown target with a set of templates and choosing the class that yields the best match: this relies on having a template set that contain every single independent realisation of target signature for a class of targets to be recognised.

Another option open to an MTI radar is to use the Doppler characteristics of moving targets in determining the target classification. Doppler is the phenomenon by which the radar return from an object is shifted in frequency due to the object's radial motion relative to a radar system. A Doppler return from a target can be observed by looking at a received echo in the frequency domain. Raw radar data from a target is recorded as a series of temporal samples. Using a n-point Fast Fourier Transform (FFT), temporal samples from a target are transformed into a spectrum comprising n frequency samples or bins. The n frequency samples form a Doppler profile where the maximum unambiguous frequency is given by the inverse of the radar pulse repetition interval and the Doppler resolution per frequency bin is 1/nth of the unambiguous Doppler.

A target classifier might be based on template matching similar to a range profile classifier but using templates of independent realisations of the Doppler profiles of moving targets. Although Doppler profiles are comparatively less sensitive to target articulations, they still exhibit fluctuations with changing target orientation and imaging geometry. Furthermore, Doppler profiles vary as a function of target speed and a profile's shape is modulated as a result of a target's vibrational and rotational motion. A target classifier based on template matching would require a prohibitively large number of stored Doppler profiles.

SUMMARY OF THE INVENTION

The present invention provides a method of recognising a radar target comprising receiving radar returns from a scene and processing the returns to produce a Doppler spectrum characterised in that the method also includes processing the Doppler spectrum to produce a Doppler feature vector and using hidden Markov modelling (HMM) to identify the Doppler feature vector as indicating a member of a particular class of targets.

The invention provides the advantage that moving targets may be classified without recourse to a large database of radar signature data.

In a preferred embodiment, the method includes arranging for targets to be encompassed within a single radar range cell. It may involve processing radar returns to obtain a sequence of Doppler spectra for each target and producing therefrom a sequence of Doppler feature vectors, and using HMM to identify the sequence of Doppler feature vectors as indicating a member of a particular class of targets. This enables classification to use linked Doppler profiles as part of a structural observation sequence: it exploits the fact that radar data for a target provides a series of Doppler profiles each offset slightly in time. Each Doppler profile is different, but over a sequence of observations the shape of the profile varies accordingly to some deterministic process. This embodiment exploits useful information in the variation of the Doppler profile with time. HMM algorithms have evolved to make use of sequences of speech signals in this way.

The method may include using HMM to identify the sequence of Doppler feature vectors by assigning to each feature vector an occurrence probability by selecting a probability distribution or state from a set thereof associated with a class of targets, multiplying the occurrence probabilities together to obtain an overall probability, repeating for other probability distributions in the set to determine a combination of probability distributions giving highest overall probability for that class of targets, then—repeating for at least one other class of targets and selecting the target class as being that which yields the highest overall occurrence probability. Probability distributions for successive feature vectors may be selected on the basis of some transitions between distributions allocated to successive feature vectors being allowed for the class of targets and others being forbidden.

A preliminary HMM training procedure may be implemented in which parameters for the states or probability distributions and transition probabilities are produced by deriving Doppler feature vectors for training data obtained from known classes of targets and calculating the mean and variance of vectors corresponding to like targets or target classes. The HMM training procedure may include a plurality of cycles through state sequences.

In another aspect, the present invention provides an apparatus for recognising a radar target comprising a radar receiver for receiving radar returns from a scene and processing means for processing the returns to produce a Doppler spectrum characterised in that the processing means also includes means for processing the Doppler spectrum to produce a Doppler feature vector and hidden Markov modelling (HMM) means for identifying the Doppler feature vector as indicating a member of a particular class of targets. The apparatus may be arranged to encompass targets within a single range cell.

The processing means may be arranged to process radar returns to obtain a sequence of Doppler spectra for each target and to produce therefrom a sequence of Doppler feature vectors, and the HMM means may be arranged to identify the sequence of Doppler feature vectors as indicating a member of a particular class of targets.

The HMM means may be arranged to identify the sequence of Doppler feature vectors by assigning to each feature vector an occurrence probability by selecting a probability distribution or state from a set thereof associated with a class of targets, multiplying the occurrence probabilities together to obtain an overall probability, repeating for other probability distributions in the set to determine a combination of probability distributions giving highest overall probability for that class of targets, then repeating for at least one other class of targets and selecting the target class as being that which yields the highest overall occurrence probability.

The HMM means may be arranged to select probability distributions for successive feature vectors on the basis of some transitions between distributions allocated to successive feature vectors being allowed for the class of targets and others being forbidden. It may be arranged to undergo a preliminary training procedure in which parameters for the states or probability distributions and transition probabilities are produced by deriving Doppler feature vectors for training data obtained from known classes of targets and calculating the mean and variance of vectors corresponding to like targets or target classes. The HMM training procedure may include a plurality of cycles through state sequences.

BRIEF DESCRIPTION OF THE DRAWINGS

In order that the invention might be more fully understood, embodiments thereof will now be described, by way of example only, with reference to the accompanying drawings, in which.

DETAILED DISCUSSION OF EMBODIMENTS

Figure 1:
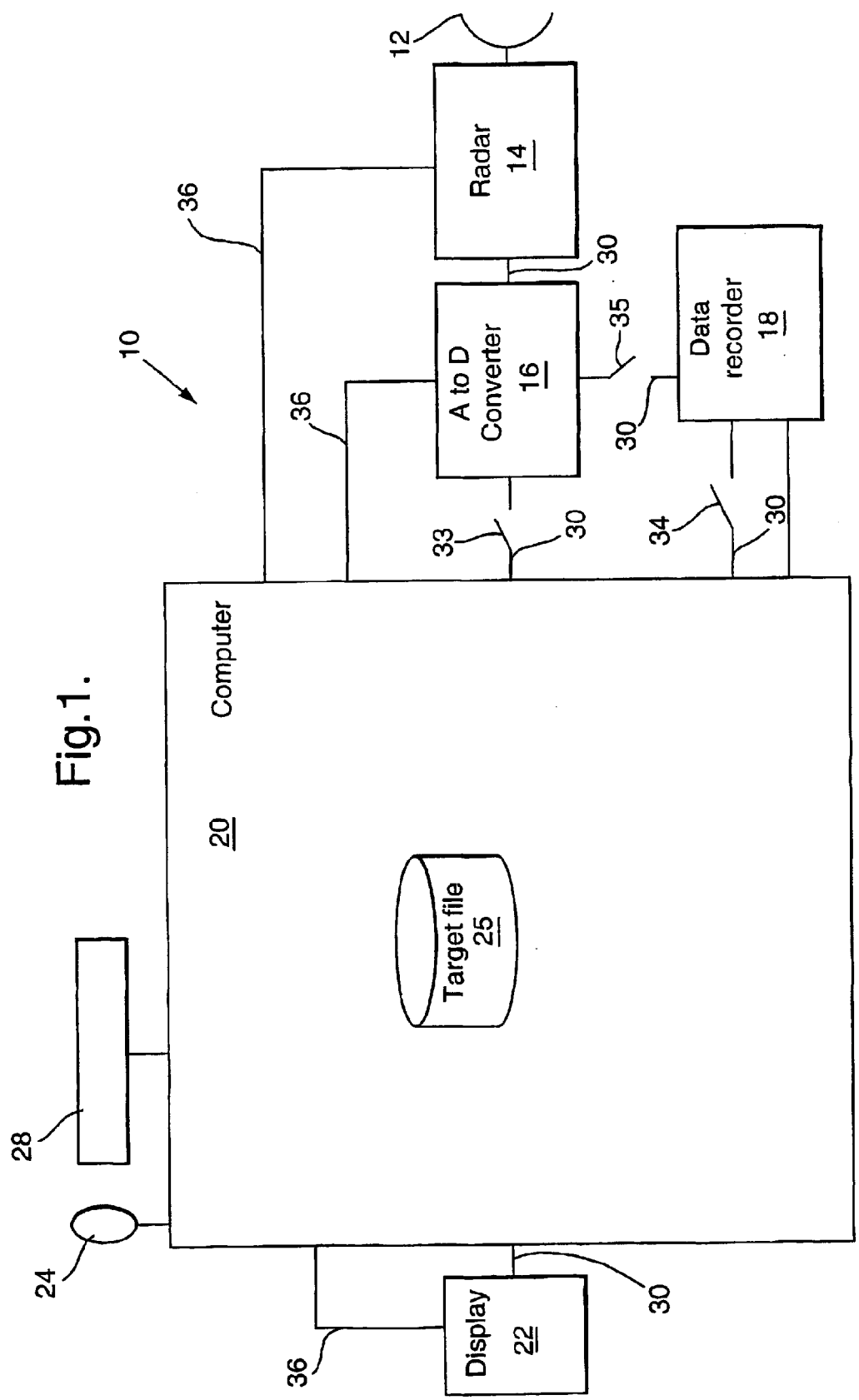
FIG. 1 is a schematic block diagram of a radar target recognition system of the invention.

Referring to FIG. 1 there is shown a radar target recognition system of the invention indicated generally by 10. The system 10 comprises an antenna 12, a radar device 14, an analogue-to-digital (A to D) converter 16, a data recorder 18, a computer 20 and a display device 22. The computer 20 is under operator control via a mouse 24 and a keyboard 28. Data passes between parts of the system 10 along data lines 30, of which those between the computer and A-to-D converter 16, the computer 20 and data recorder 18, and the A-to-D converter 16 and data recorder 18 include respective switches 33, 34 and 35. Control lines 36 provide for computer-generated control signals to pass to the radar device 14, the A-to-D converter 16 and the display device 22. A communication line 37 is provided for passing messages between the computer 20 and data recorder 18.

The antenna 12 is a fixed, high gain dish antenna. The radar device 14 is a "Midas" radar which is manufactured by Thales-Wells and described in the paper "Wide bandwidth mobile radar for ISAR/SAR radar imaging" by J D Mckenzie and E J Brown-Kenyon in the Proceedings of the Institute of Electrical Engineers, volume 219 pages 1 to 6, 1994.

The Midas radar is a static ground based coherent pulsed radar. It uses the same antenna for transmitting and receiving and is therefore a monostatic system. It operates at a centre frequency of 15.75 GHz and at this frequency the antenna has a circular beam width of 1.9 degrees. The radar has a peak transmit power of 200W that gives it a maximum operating range of 2000 m between itself and the target. It is capable of operating at a bandwidth ranging from 10 MHz to 500 MHz. For this embodiment the operating bandwidth is set to 15.6 MHz which results in a range resolution of 9.6 m. The radar is linearly polarised with both transmit and receive polarisations set to horizontal. It operates by transmitting a series of pulses at an interval of $2.441 \times 10^{-4}$ seconds.

After each pulse has been transmitted, the radar is quiescent for a short duration and then records 32 values corresponding to radar echo from a series of 32 concurrent range cells. The range cells are arranged along a radial line extending outwardly from the antenna centre. The first range cell is the nearest in range to the antenna and the last the furthest in range. The radar uses the time delay between the end of transmission of a pulse and the start of the recording of the first range cell to determine the slant range offset to the start of the first range cell. Each range cell contains the radar backscatter from a region bounded by a non-overlapping footprint on terrain being monitored by the radar. Any object or part of an object and all parts of the terrain that are exposed to the radar and fall within the boundary of the range cell radar footprint contribute to the radar echo received by the radar. The radar footprint corresponding to each range cell can be approximated to a rectangular shape with a width along slant range equal to the radar range resolution which is 9.6 m and a cross-range width given by the product $Rs_i\theta_{az}$: here $\theta_{az}$ is the antenna azimuth beam width that is 1.9 degree in this embodiment and $Rs_i$ is the slant range offset from the radar to the ith range cell. $Rs_i$ is a function of the range offset to the first range cell and the gate number and is given by:

$$Rs_i = r_0 + \Delta r(i-1), 1 \leq i \leq 32 \quad (1)$$

where $\Delta r$ is the slant range resolution and $r_0$ is the range offset to the first range cell. For this embodiment $r_0$ is set to 250 m. The range offset for the $32^{nd}$ range cell is therefore 557.2 m. The radar footprint for each range cell has a constant range extent but increases linearly with slant range in the azimuth direction. For this embodiment the azimuth extent increases from 8.3 m for the first range cell to 18.5 m for the $32^{nd}$ range cell. The maximum dimension of targets to be classified by this embodiment is 8 m the radar is capable of placing the radar echo from the entire target into the value of a single range cell. It is not in fact essential to do this but it makes the recognition process simpler—the target can be spread over a number of range cells if desired.

The antenna can pan 360 degrees in azimuth and from −10 degrees to +20 degrees in elevation. The elevation angle is set to 0 degrees and the azimuth angle is adjusted manually so that it is pointing directly at the target. The radar will capture the backscatter from the target when it comes within the slant range interval of 557.2 m to 250 m from the radar. Each of the 32 values that the radar records for each pulse that is transmitted is a complex valve with a real and imaginary part. The analogue signal is passed through a A-to-D converter where the signal is digitised. All subsequent processing is performed on the digital data. The radar has a pulse repetition interval is $2.441 \times 10^{-4}$ seconds, and it transmits 4096 pulses per second and receives data for 32 range cells for each pulse.

The A-to-D converter 16 is of a standard type, for example a Tektronics model TKAD10C and is capable of digitising both real and imaginary parts of a complex input signal. The data recorder 18 is a standard high-speed magnetic tape recorder, for example an Ampex 107 DCRsi recorder which records data at a rate of 107 Mbits s$^{-1}$. The computer 20 is a standard parallel computer, for example a Hewlett Packard model V2500 having twenty CPU nodes of type PA8500, a clock rate of 440 MHz and a memory capacity of 0.5 terabytes. The system 10 has a graphical user interface (GUI) which is displayed on the display device 22 and with which an operator may interact with the system 10 using the mouse 24 and the keyboard 28. Results generated by the system 10 are also displayed on the display device 22, together with standard information generated by radar apparatus, such as a target's range and velocity.

The system 10 recognises and classifies moving targets as belonging to one of three target groups, namely personnel, wheeled vehicles and tracked vehicles. The vehicles must be of specific shapes and in standard configurations, for example vehicle doors must be closed. A target is reliably recognised by the system 10 if it is moving in a straight line either head-on or tail-on with respect to the antenna 12. A target is said to move head-on to the antenna 12 if it is moving directly towards it, and is said to move tail-on to the antenna 12 if the target is moving directly away from the antenna 12. If the target is a person, recognition will reliably occur if the person is moving at walking or jogging pace. If the target is a wheeled vehicle or a tracked vehicle, recognition will reliably occur if the vehicle is travelling a speed of 20 km h$^{-1}$.

Before the system 10 can be used to recognise and classify unknown targets moving in the manner described above into the three target groups, it must be trained to do so. The system 10 is trained as follows.

The system 10 is first used to gather training data corresponding to radar returns from a set of co-operative example targets which comprises target classes into which the system 10 is required to classify unknown targets in practice. In the present embodiment, the target groups are personnel, wheeled vehicles and tracked vehicles. Switches 33 and 34 are opened and switch 35 is closed. Members of a set of co-operative example targets comprising personnel, wheeled vehicles and tracked vehicles are brought serially into the main radiation lobe of the antenna 12. The co-operative targets move head-on and tail-on with respect to the antenna 12. The personnel move at walking and jogging paces, and the wheeled and tracked vehicles move at a speed of 20 km h$^{-1}$. Twenty-five co-operative example targets are used to train the system 10. Table 1 shows the number of co-operative example targets belonging to each target group and the numbers that are arranged to move head-on and tail-on to the antenna 12.

TABLE 1

| Target Group | Head-on | Tail-on |
| --- | --- | --- |
| Personnel | 6 | 2 |
| Tracked Vehicles | 5 | 4 |
| Wheeled Vehicles | 4 | 4 |

Training data gathered by the system 10 for a particular target group includes data from just one example target within that group. For example, for the target group "wheeled vehicles", training data may be gathered from a lorry. However, in use, the system 10 is able to recognise and classify any wheeled vehicle for example, a car, a Land Rover or a lorry.

The co-operative target is set into motion and the radar antenna is steered to point directly at the target. The radar is switched on and starts transmitting pulses at 4 kHz pulse repetition frequency. A radar operator monitors the received radar echo on display device 22: when the target comes into the 250 m to 557.2 m range interval, the operator switches on the radar record mode. The operator uses the keyboard 28 to enable the record mode. Once the record mode has been enabled, for each pulse that is transmitted the radar device 14 captures data for 32 range cells which are digitised by the A-to-D converter 16 and stored serially on the data recorder 18.

One pulse of the radar generates 32 complex values that are stored as a continuous data block on the data recorder 18 which is sandwiched between a header block and a footer block. The data for the header block and footer block is generated by radar device 14 and contain information regarding the radar operating mode set up and recording mode set up which are useful for post processing purposes. Data for a total of 16384 pulses is recorded after which the recording mode is disabled. The data recorder device 14 sends tape addresses for the start and end of the recording sequence to the computer 20 via the communication line 37 which is displayed on the display device 22 using the data link 30. The operator takes a manual record of the start and end tape addresses and also notes the target type and whether it was moving head-on or tail-on. This information is required in order to form a target file.

The process is repeated for a total of twenty-five co-operative targets that are listed in Table 1 and that manoeuvre in the manner explained earlier: i.e. vehicles moving at 20 km/hr and personnel at walking or jogging pace. Once all the twenty-five co-operative targets have been imaged the data capture phase is complete.

On completion of data capture, switch 34 is closed and switch 35 is opened. Using keyboard 28 the operator enters a tape address for the first co-operative target. The computer 20 sends an instruction to the data recorder 18 via the communication link 37 to read the data from the tape at the entered address and process it through a series of routines which run on the computer 20.

Figure 2:
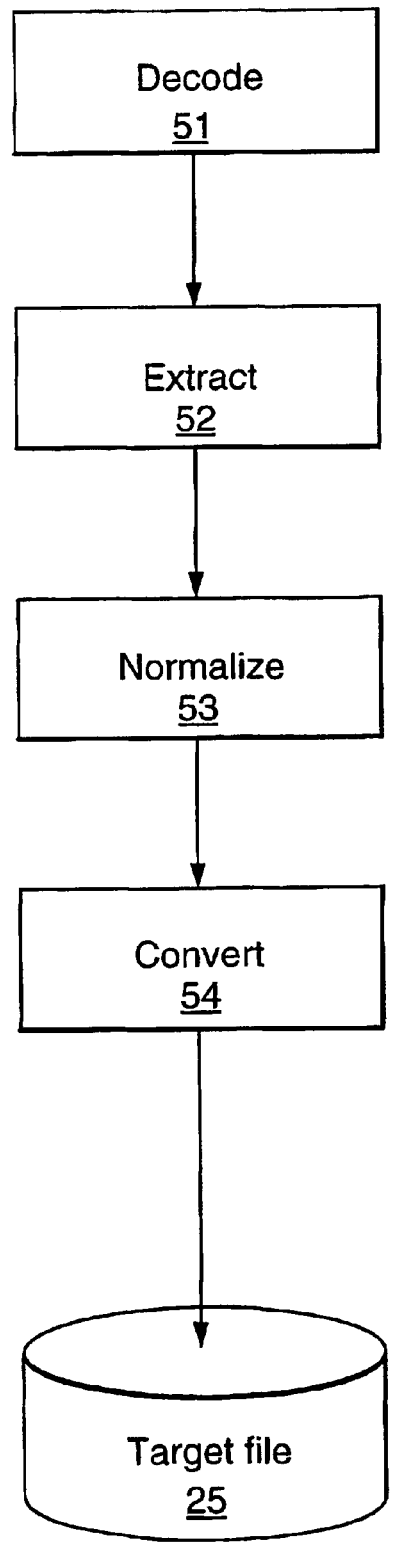
FIG. 2 is a flow diagram of processing routines used in the FIG. 1 system.

Referring now to FIG. 2 there is shown a flow diagram illustrating the series of routines 51 to 54 executed by the computer 20 to process data from the data recorder 18. The series comprises a data decoding routine 51, a target extraction routine 52, a Doppler normalisation routine 53 and a temporal to Doppler frames conversion routine 54. At the entered address in the data recorder 18 the computer 20 reads data for 16384 pulses. The data format used to record data on the data recorder 18 consisted of a header block followed by a data block of 32 complex values corresponding to the 32 range cells recorded per pulse followed by a footer block. The decode routine 51 strips of the header and footer information and places the 32 complex values into a data matrix. The decode operation is performed for all the 16384 pulses that were recorded on the data recorder 18 during data capture. The output after the decode routine 51 is a 2-dimensional matrix that has 16384 rows with each row containing 32 columns. Each row represents radar data received from individual pulses and each column represents data from individual range cells. Therefore, for example element (100, 12) will be the radar data derived from the 100th pulse at the 12th range cell.

The 2-dimentional data matrix from decode routine 51 is processed by the target extraction routine 52. The "extract" or target extraction routine 52 detects the range cell that contains the radar return from the co-operative example target. This is achieved using standard detection algorithms based on fixed thresholding or constant false alarm rate adaptive thresholding which are familiar to those skilled in the art of radar engineering. Once the range cell occupied by the co-operative example target has been identified, the 2-dimensional data matrix is reduced in size by dropping all columns with the exception of the target range cell column. This results in reducing the 2-dimensional data matrix to a i-dimensional array that has 16384 rows and just one column. The 1-dimensional array is data from a single range cell occupied by the co-operative example target over 16384 pulses. The 16384 element array is an array of temporal samples of the co-operative example target where each element is separated temporally by $2.441 \times 10^{-4}$ seconds. The total array is equivalent to a temporal duration of $2.441 \times 10^{-4} \times 16384 = 4$ seconds.

The 1-dimensional array from routine 52 is then passed through to the Doppler normalisation routine 53. The input to the routine 53 is a 16384 element temporal array. A 16384 point FFT is performed on the 1-dimensional data that produces a 16384 element Doppler spectrum. The 1-dimensional array now represents frequency response from the co-operative example target. Each element in the array is a frequency or Doppler bin. The first element corresponds to a frequency of 0 Hz and the last element 4 kHz. Intermediate bins are separated in frequency by 4096/16384 Hz. Since the co-operative example target has a non-zero radial velocity with respect to the radar antenna 12 it will manifest as a peak in the Doppler spectrum somewhere between frequency bin numbers 0 and 16383. Using a peak detector the Doppler bin containing the peak amplitude is identified. The whole 16384 array is then shifted to the left by the peak amplitude Doppler bin number so that the peak in the Doppler spectrum corresponds to Doppler bin zero. This has the effect of normalising the data so that the target Doppler appears to be 0 Hz. An inverse FFT is performed on the resultant 16384 array to return to an array that represents temporal (time domain) samples of the co-operative example target.

The 16384 element temporal array from routine 53 is then processed by the data conversion routine 54, transforms the 1-dimensional temporal array into a 2-dimensional Doppler frame matrix. In routine 54, each of the 16384 elements is initially a complex number with real and imaginary components: the imaginary component is discarded leaving only the real component. The first 128 elements in the 16384 element array are then selected and transformed into a 128 element Doppler vector using a 128-point FFT with Hamming weighting window. The 128 elements in the Doppler vector are complex values that are converted into log-amplitude values. The Doppler vector constitutes one Doppler frame of the radar signature of the co-operative example target. The Doppler frame is placed into the first row of a new 2-dimensional matrix. The 128 element of the Doppler frame form the elements of the 128 columns of the 2-dimensional matrix. Then another 128 elements are selected from the original 16384 element array of temporal samples using an offset of 20 elements from where the previous selection of 128 elements was made. These 128 temporal samples are processed in a similar manner to generate a Doppler Frame vector. This second frame is placed along row 2 of the new 2-dimensional matrix. This process is repeated, each time selecting another 128 element vector from the array of temporal samples using the appropriate off set, performing the FFT and storing the Doppler frame in the 2-dimensional matrix until there are no more samples to select from the original 16384 element temporal sample array. Through the choice of the size of the FFT window and the overlap in the elements used in calculating the Doppler frame vectors the process produces 800 independent Doppler frames. Thus the final size of the 2-dimensional matrix is 800 rows by 128 columns. Each row in this 2-dimensional matrix constitutes data for the co-operative example target for an independent Doppler frame where the elements of the columns are the actual Doppler spectral values.

The 2-dimensional matrix output by convert routine 54 is stored as a target file 25 within the computer 20. Using the keyboard 28, the radar operator gives the target file 25 a file name. The naming convention is letter/underscore/letter/underscore/number: the first letter in the name represents target class, P for personnel, T for tracked vehicles and W for wheeled vehicles; the second letter represents target direction of motion, H for head-on and T for tail-on; the number uniquely identifies each target file from a particular class.

The numbers are not repeated for the target files belonging to a particular class: they may however be reused when naming target files that belong to separate classes. Thus a target file could be named P_$H_{13}$ 2, which denotes that the target file is from an example of a co-operative target of the type personnel that is moving head-on to antenna 12 and it is file number 2 in this particular class. Since each target file 25 contains a 2 dimensional matrix in which each row is an independent Doppler frame, the entire file therefore represents a sequence of Doppler frames from the co-operative example target.

Target files for the other twenty-four co-operative example targets are generated in a like manner. A total of twenty-five target files are therefore stored in the computer 20, each representing a sequence of Doppler frames that constitutes the target signature of an example co-operative target.

Each target file 25 consists of a series of 800 Doppler frames (they are the rows of the 2-dimensional matrix) and each Doppler frame is a 128 element vector. However, the elements in the Doppler frame are not independent and the size of the Doppler frame vector can be reduced without loss of information. This embodiment of the invention uses an algorithm called Linear Discriminant Analysis (LDA) to perform the data reduction. LDA are a widely used algorithm and a good description of this can be found in a paper by M. J. Hunt and S. M. Richardson in 'An Investigation of PLP and IMELDA acoustic representations and their potential combination', in proceedings of the IEEE ICASSP 1991, volume 2, pp 881 to 884. LDA is meant to improve information content by exaggerating differences between natural groupings in the data set (i.e. between classes) while inhibiting differences within the groups. The LDA process calculates a linear transformation that converts an n-element vector to a m-element vector where m<n. This can be expressed symbolically as $$Y=g(X) \qquad (2)$$

Where X is the n-element vector, Y is the m-element vector and g( ) is the linear transformation function. This embodiment of the invention uses the 'Fisher Criteria' LDA which states that the maximum number of elements of the vector Y is one less the total number of categories. The LDA process categories are shown in Table 2:

TABLE 2

| Person | Head-on |
| Person | Tail-on |
| Wheeled Vehicle | Head-on |
| Wheeled Vehicle | Tail-on |
| Tracked Vehicle | Head-on |
| Tracked Vehicle | Tail-on |

There are a total of six categories. These are termed 'fine' label since for recognition only three class labels are defined namely 'personnel', tracked vehicle and 'wheeled vehicle'. Since the invention uses 'Fisher Criteria' the maximum number of elements in the transformed vector is five. The present embodiment of the invention sets the number of elements in the output transformed vector to four.

Figure 3:
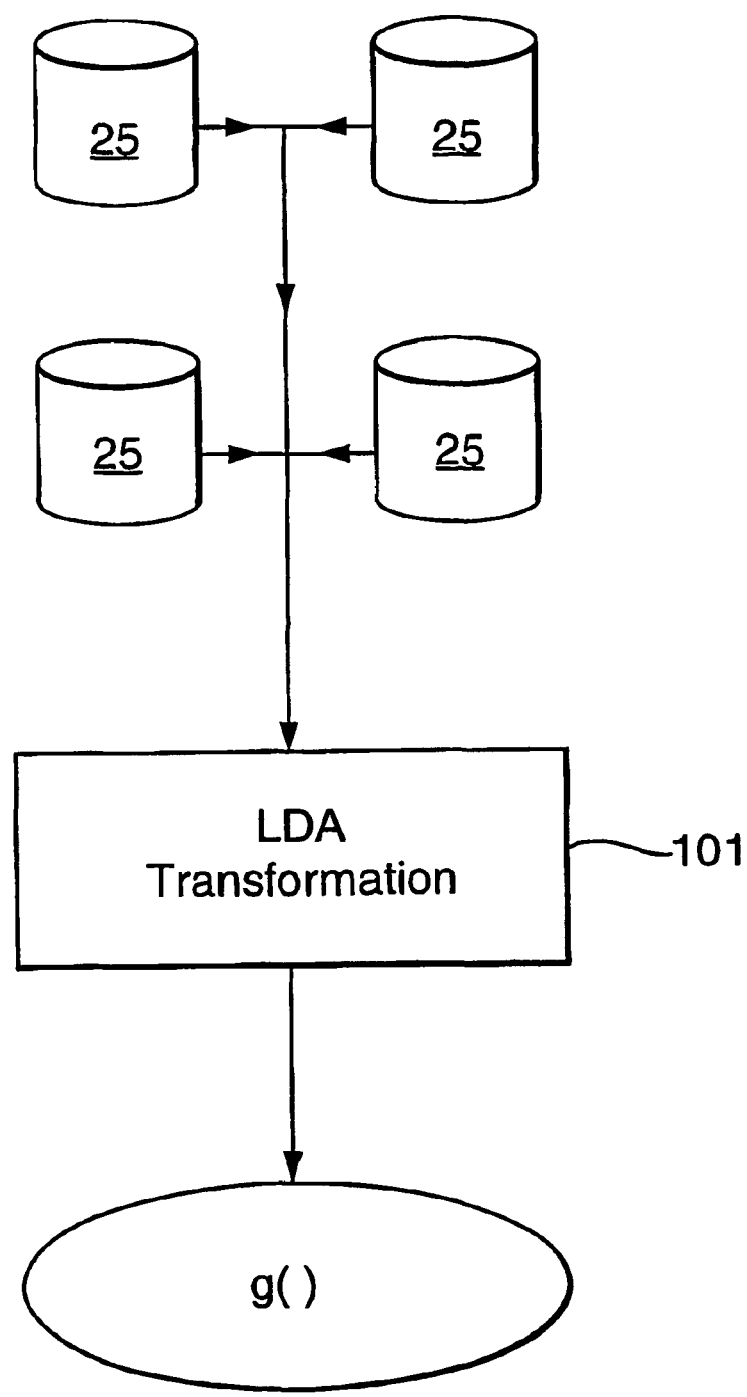
FIG. 3 illustates use of an LDA routine to calculate an LDA transformation function in the FIG. 1 system.

The data reduction is performed in two steps. Referring now to FIG. 3, all twenty-five of the target files 25 (of which four are shown) are processed by an LDA routine 101 that is executed by the computer 20 to calculate the LDA transformation function g ( ). The LDA routine 101 extracts the 'fine' labels from the file names of the target file 25. The fine label is based on the first two letters in the name of target file 25. The computed g transform is stored in the computer 20.

Figure 4:
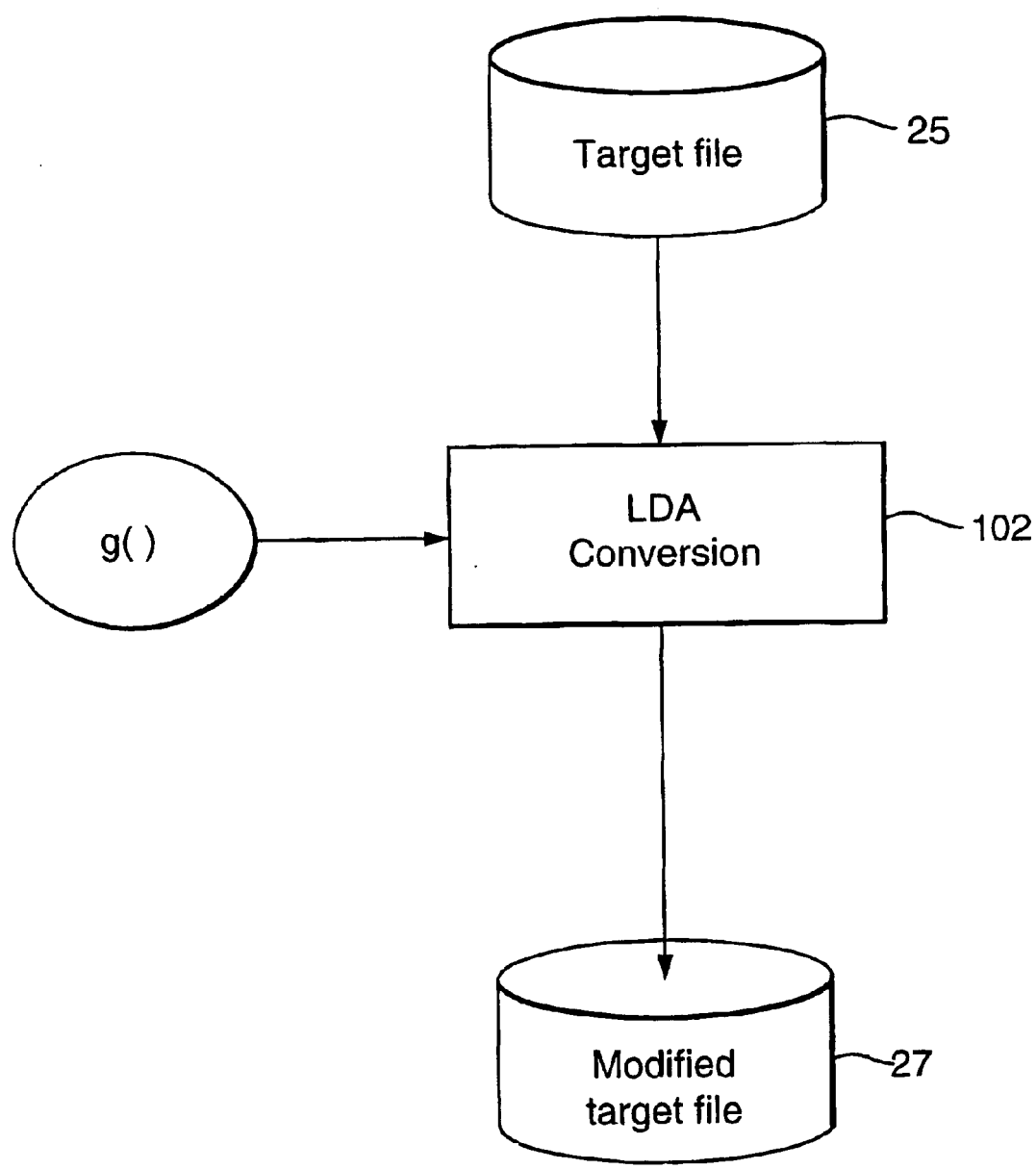
FIG. 4 illustrates modifying target files by LDA conversion in the FIG. 1 system.

Referring now to FIG. 4, target files 25 are presented individually to an LDA conversion routine 102 that is run on computer 20. The target file 25 that is input to routine 102 is a two-dimensional matrix of 800 rows of Doppler frame, where each Doppler frame is a 128 element vector. Using the LDA transformation function g( ) calculated by routine 101 each row of the 800 row matrix is a vector with just four elements. Thus the original 128 element Doppler frame vector has been reduced to a feature vector with just four elements or features. The output of routine 102 is another two-dimensional matrix which has 800 rows but only 4 columns per row. The output of routine 102 is stored as modified target file 27. The modified target file 27 now represents a sequence of 800 feature vectors for the co-operative example targets where each feature vector has just 4 feature (or elements). Modified target files for the other 24 co-operative example targets are generated in a like manner using the corresponding target files 25. A total of 25 modified target files are therefore stored in the computer 20, each containing data representing the sequence of feature vector of an example so-operative target.

Figure 5:
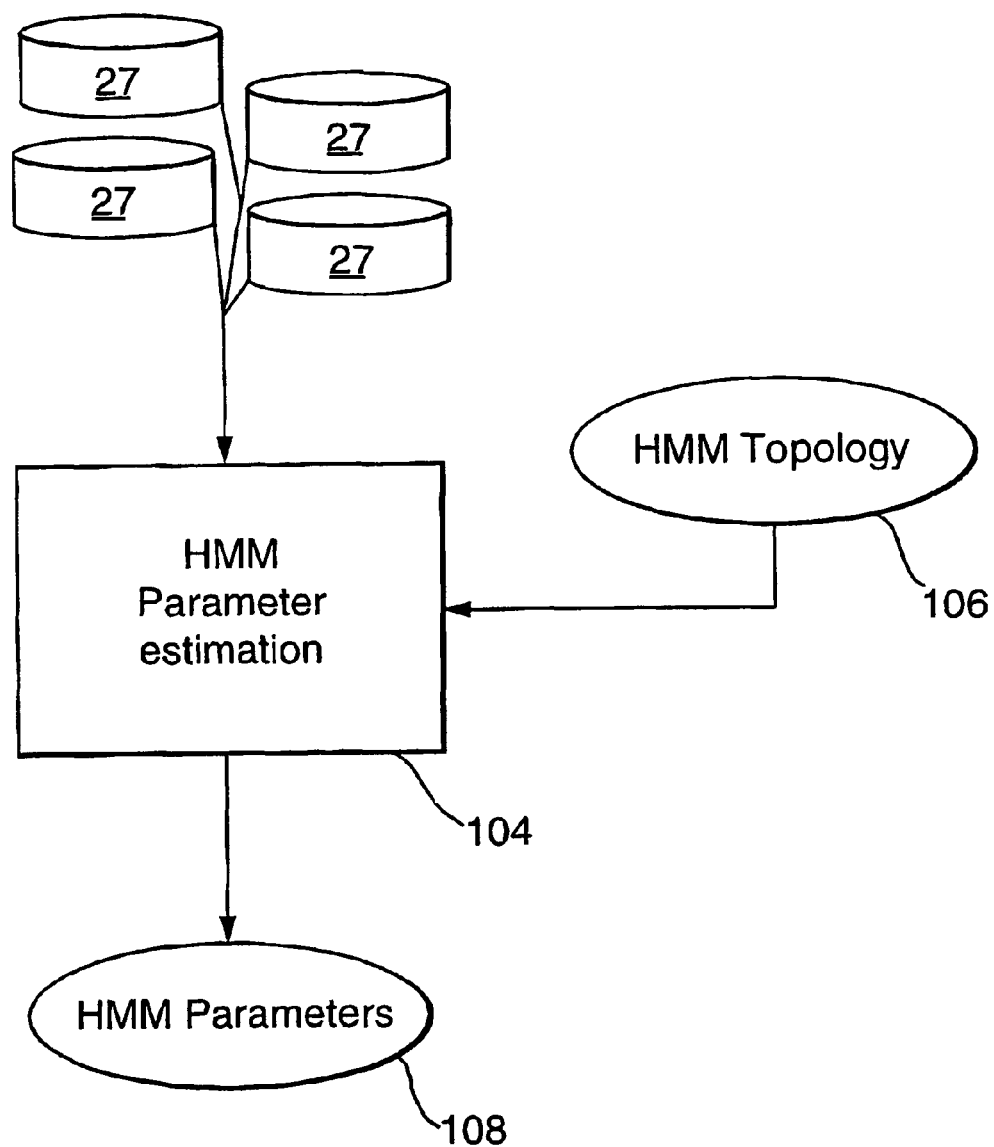
FIG. 5 illustrates HMM parameter determination.

Referring now to FIG. 5, modified target files 27 are grouped according to the target group from which they are derived. A hidden Markov model (HMM) parameter estimation routine 104 receives data sets input in turn from groups of modified target files corresponding to personnel, wheeled vehicles and tracked vehicles. It also receives an appropriate HMM topology 106, and produces three corresponding sets of HMM parameters at 108.

Figure 6:
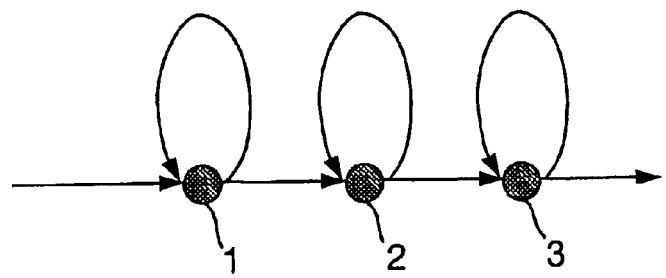
FIGS. 6 to 8 illustrate HMM topologies.
Figure 7:
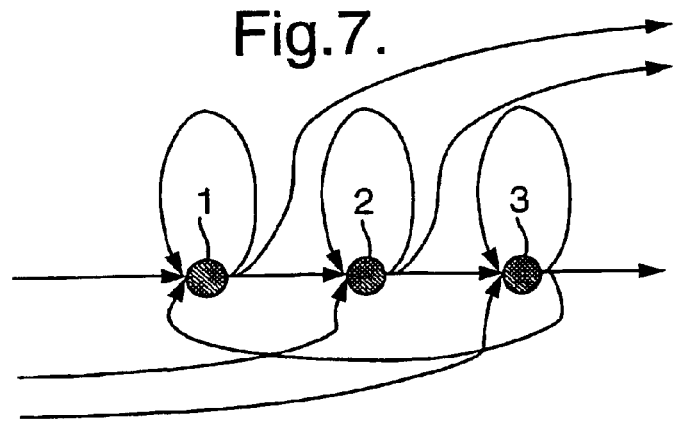

FIG. 6 shows a simple HMM of the kind used in speech recognition: it is possible to use it in the present invention but better performance is obtained with the topology shown in FIG. 7. FIG. 7 schematically illustrates the Hidden Markov Model (HMM) topology implemented by the HMM parameter estimation routine 104. The HMM topology has three states, 1, 2, 3. Corresponding to each state there is a state output distribution which is a multivariate four-dimensional Gaussian probability distribution in which the probability of observing a given four-element vector is given by $$p(x) = \frac{1}{(2\pi)^2 (\det \Sigma)^{1/2}} e^{\frac{1}{2}(x-\mu)^T \Sigma^{-1} (x-\mu)} \qquad (3)$$

where $\chi$ is a 4-component vector of a modified data file, $\mu'$ is a 4-component mean vector and $\Sigma$ is a 4-by-4 covariance matrix. Each HMM state has four mean parameters and 16 variance parameters (of which only ten are independent as the covariance matrix is symmetric by definition). For each target group, each of these parameters is calculated from modified target files by the HMM parameter estimation routine 104 which implements a HMM estimation algorithm of the kind known in the art of speech recognition. Only a fraction of the 800 frames from a single modified target file can be used to estimate the parameters of any given HMM state. Thus the 800 frames from a single target file are effectively divided into sub-groups corresponding to each state and the parameters In the present embodiment the models are initialised using a simple linear division of the time axis into equal segments to give the groups of frames. Other initialisation strategies include allocating frames to states on a cyclic basis, with the period of the cycle chosen to optimise a goodness-of-fit criterion and/or labelling parts of a database by hand to indicate which groups correspond to which frames.

Subsequently, the well-known HMM re-estimation algorithms perform an automatic alignment which gives a weighting for the correspondence of each frame to each state, and weighted sums of the feature vectors are used to recompute state mean and variance parameters for each state.

Apart from the state output distributions, an HMM also incorporates a "state transition matrix", the non-zero elements of which both define allowed state transitions (the "topology of the model) and specify probabilities for occurrence of each allowed transition. Zero elements prohibit transitions. Thus the HMM topology may be represented by a diagram such as FIG. 7, in which there is a filled circle corresponding to each state and an arrow corresponding to each non-zero element in the transition matrix.

The state transition matrix is required to be "row-stochastic", that is the sum of the numbers in each row should be unity. It is typically initialised by setting all the non-zero elements in each row to the same value, a value chosen to satisfy the row-stochastic constraint. An alternative initialisation for the present invention would be to set the probabilities to small values for "self-loop" transitions (the transition from a state to itself) and larger values for the other allowed transitions, thus promoting the desired behaviour of cycling through the states to explain the observed data.

This transition matrix is also optimised by the HMM re-estimation algorithms. In normal use those algorithms do not allow zero entries in the transition matrix to become non-zero. Therefore the initial topology diagram remains valid after re-estimation, although the probabilities associated with each of the transitions will have changed and, in some circumstances, some of those probabilities may have become zero.

The topology represented in FIG. 6 is typical "left-to-right" topology commonly used in speech recognition. This can be extended to allow repeated cycling through the sequence of states and entry to and exit from any state as illustrated in FIG. 7, which defines the topology for three state models used in the example of the invention described here.

Figure 8:
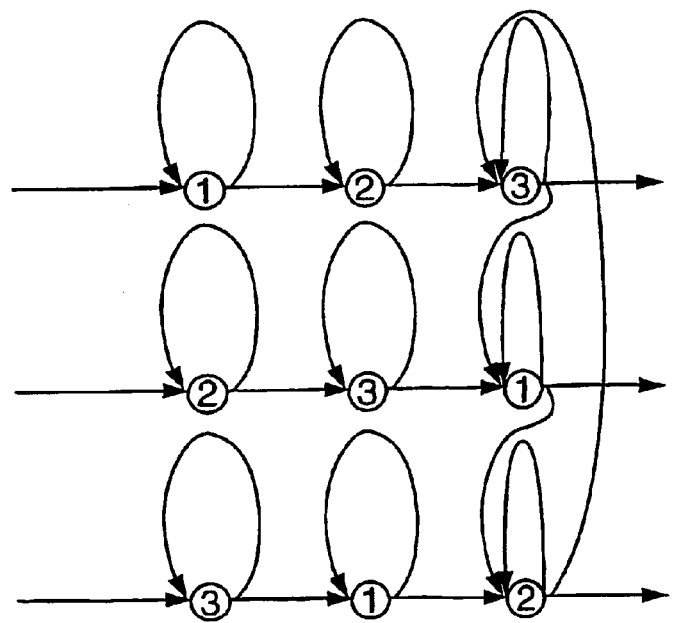

The topology of FIG. 7 has a drawback in that it does not ensure that the full cycle of states is observed in recognising a given target: a more complex topology is illustrated schematically in FIG. 8 which achieves this using the well-known principle of tying of state output distributions. In FIG. 8, the states labelled '1' share a single common probability distribution 01 and the re-estimation process is modified to pool the corresponding data; similarly, those labelled '2' share another such distribution 02 and those labelled '3' share a further distribution 03.

The task of the HMM parameter estimation routine 140 is to optimise the values of the transition matrix probabilities and the state output distributions for each state and each model given the training data. The routine used is well-known in a different field, that of speech recognition: it is described for example in "Speech Synthesis and Recognition" by J. N. Holmes, Van Nostrand Reinhold (UK) 1988. For each target group, the output of the routine 140 is a Hidden Markov Model comprising a state output distribution parameters for each of the states of the model and a state transition matrix.

Following training as described above, the system 10 may be used to recognise and classify unknown targets when such targets move within the main radiation lobe of the antenna 12. Target recognition is carried out as follows. The system 10 is configured with switch 33 closed and switches 34 and 35 open. For a given unknown target, a radar return is digitised to create a radar data file as previously described. The radar data file is passed directly to the computer 20. The routines 52, 53 and 54 previously described are carried out on the radar data file to create a target data file corresponding to the unknown target.

The target file is then operated by routine 102, where the LDA transformation function g( ) calculated during the training phase is used to transform each 128 element vector per row of the target file 25 to a vector with just 4 elements per row. This then forms the modified 4-element target file which contains 800 frames for the unknown target. The modified target file is then processed by the HMM classification routine 206. The present implementation uses the well-known HMM Viterbi recognition algorithm described for example in the book "Speech Synthesis and Recognition" by J. N. Holmes, Van Nostrand Reinhold (UK). For a given for a given data file, this algorithm efficiently computes and compares matching scores for different hypotheses as to the file contents. In the present implementation may be performed in "forced choice" or "unforced choice" modes.

"Forced choice" mode compares the following set of hypotheses for three target classes P, T and W:

$$\{P, T, W, \_P, \_T, \_W, P\_, T\_, W\_, \_P\_, \_T\_, \_W\_\}$$

where P, T, and W are the target class models and _ represents a background model (no target present). "Unforced choice adds a single further hypothesis which is the _ or "no target" model. The best scoring hypothesis is reported by the recognition algorithm; the classification of the target file is given by stripping the "no target" symbols from the recognition output to leave one of the three target symbols (or possibly nothing in the "unforced" case).

This completes the classification stage where an unknown target is classified into one of the three target classes, i.e. the target is classified as a person, a wheeled vehicle, tracked vehicle or as belonging to an unknown class.

Figure 9:
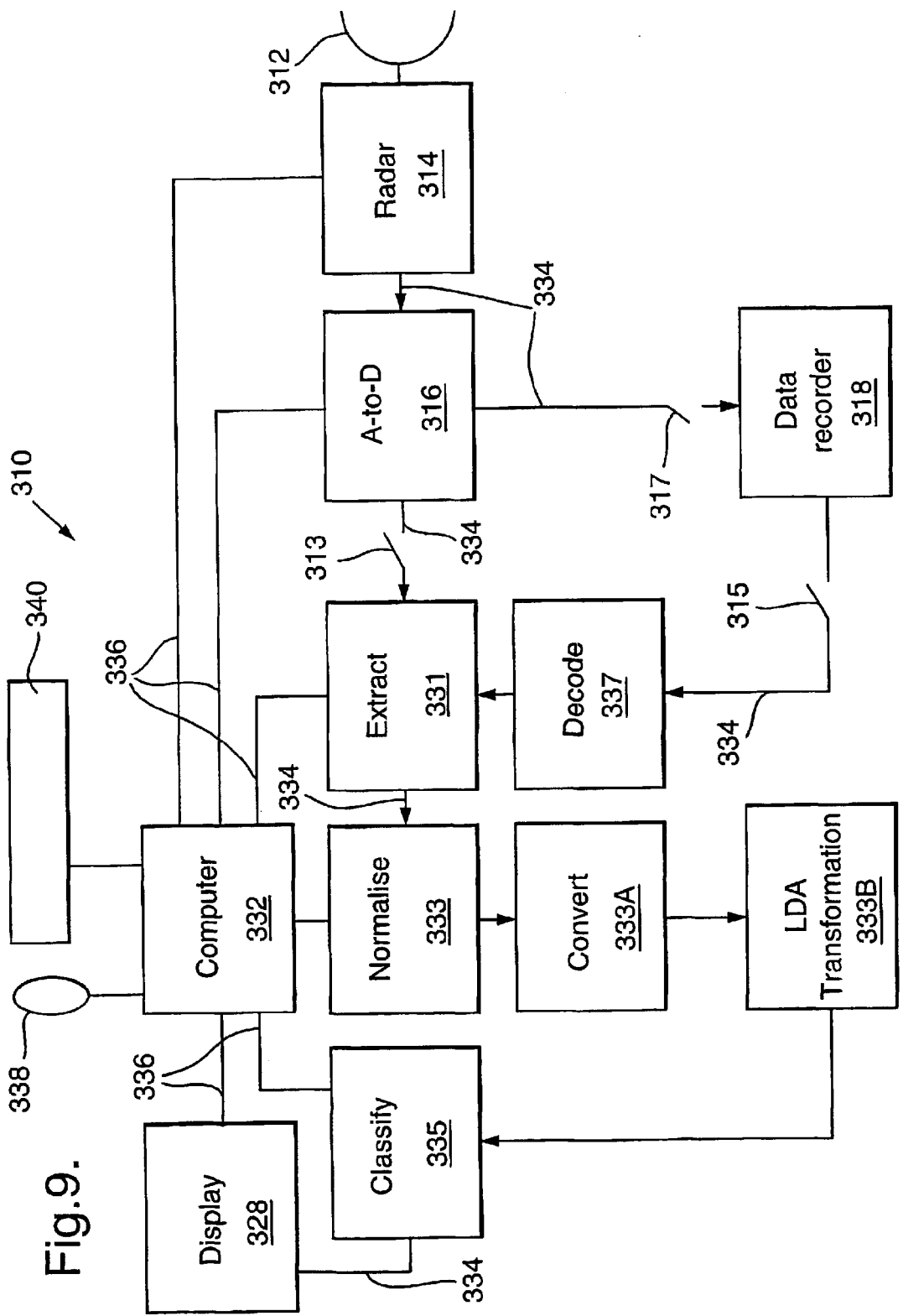
FIG. 9 is a schematic block diagram of another embodiment of a radar target recognition system of the invention.

Referring now to FIG. 9, there is shown an alternative target recognition system of the invention indicated generally by 310. The system 310 comprises a decode module 337 for decoding data stored in the data recorder 318 and digital signal processors (DSPs) 331, 333, 333A, 333B and 335. The DSP 331 extracts target Doppler signatures for a single range bin as previously described. DSPs 333, 333A and 333B perform Doppler normalisation, conversion to Doppler frames and LDA reduction also as described earlier. DSP 335 carries out HMM parameter estimation and target classification as previously described. The system 310 further comprises a display 328, an A-to-D converter 316 and a radar device 314. The computer 332 controls the display 328, the A-to-D converter 316, the radar device 314 and the DSPs 331, 333, 333A, 333B and 335 by means of control signals conveyed over control lines 336. The systems 310 and 10 operate similarly, but in the system 310 processing of radar data is carried out by the DSPs 331, 333, 333A, 333B and 335 and not by the computer 332.

The invention may use bistatic radar with circular radiation polarisation or any combination of horizontal, vertical and circular polarisations.

The radar device may be continuous-wave (CW). The radar device's output power may be other than that described above, but should be large enough to obtain a signal-to-noise ratio from the target at a desired range sufficient to give satisfactory classification performance. The radar device may have a pulse repetition frequency other than 4.096 kHz: however the pulse repetition frequency should be sufficiently large to resolve various Doppler frequencies associated with the target and to avoid ambiguous Doppler returns.

Target recognition systems of the invention may be ground-based, air-borne or space-borne. In the case of embodiments of the invention which move relative to the earth, clutter reduction techniques are preferably employed to reduce clutter returns. A scanning antenna may be employed.

Digitised radar return signals from co-operative and unknown targets may be stored in a data recorder and training and target classification may be performed at a time subsequent to collection of training data and radar returns from unknown targets. The transmission frequency of the radar 314 may be any frequency used for surveillance radars, e.g. from a few MHz to 100 GHz. The invention may use FFT window sizes and window overlaps other than those described. Likewise a transformation other than LDA could be used to reduce vector size of input frames.

The invention may be set up to classify more than three classes of targets: a fourth class of target e.g. aircraft could be introduced. This would require the appropriate amount of training data from the extra class and estimating the relevant HMM parameters that would define data from that class. The number of states used for each target may be chosen to be different for different target classes. The output distribution of each state could be modelled as a Gaussian mixture distribution instead of a simple multivariate Gaussian.

What is claimed is:

1. A method of recognising a radar target comprising receiving radar returns from a scene and processing the returns to produce a Doppler spectrum characterised in that the method also includes processing the Doppler spectrum to produce a Doppler feature vector and using hidden Markov modelling (HMM) to identify the Doppler feature vector as indicating a member of a particular class of targets.

2. A method of recognising a radar target according to claim 1 characterised in that the method includes processing radar returns to obtain a sequence of Doppler spectra for each target and producing therefrom a sequence of Doppler feature vectors, and using HMM to identify the sequence of Doppler feature vectors as indicating a member of a particular class of targets.

3. A method of recognising a radar target according to claim 2 characterised in that the method includes using HMM to identify the sequence of Doppler feature vectors by assigning to each feature vector an occurrence probability by selecting a probability distribution or state from a set thereof associated with a class of targets, multiplying the occurrence probabilities together to obtain an overall probability, repeating for other probability distributions in the set to determine a combination of probability distributions giving highest overall probability for that class of targets, then repeating for at least one other class of targets and selecting the target class as being that which yields the highest overall occurrence probability.

4. A method of recognising a radar target according to claim 3 characterised in that it includes selecting probability distributions for successive feature vectors on the basis of some transitions between distributions allocated to successive feature vectors being allowed for the class of targets and others being forbidden.

5. A method of recognising a radar target according to claim 4 characterised in that it includes a preliminary HMM training procedure in which parameters for the states or probability distributions and transition probabilities are produced by deriving Doppler feature vectors for training data obtained from known classes of targets and calculating the mean and variance of vectors corresponding to like targets or target classes.

6. A method of recognising a radar target according to claim 5 characterised in that the HMM training procedure includes a plurality of cycles through state sequences.

7. A method of recognising a radar target according to claim 1 characterised in that targets encompassed within a single radar range cell.

8. Apparatus for recognising a radar target comprising a radar receiver for receiving radar returns from a scene and processing means for processing the returns to produce a Doppler spectrum characterised in that the processing means also includes means for processing the Doppler spectrum to produce a Doppler feature vector and hidden Markov modelling (HMM) means for identifying the Doppler feature vector as indicating a member of a particular class of targets.

9. Apparatus for recognising a radar target according to claim 8 characterised in that the processing means is arranged to process radar returns to obtain a sequence of Doppler spectra for each target and to produce therefrom a sequence of Doppler feature vectors, and the HMM means is arranged to identify the sequence of Doppler feature vectors as indicating a member of a particular class of targets.

10. Apparatus for recognising a radar target according to claim 9 characterised in that the HMM means is arranged to identify the sequence of Doppler feature vectors by assigning to each feature vector an occurrence probability by selecting a probability distribution or state from a set thereof associated with a class of targets, multiplying the occurrence probabilities together to obtain an overall probability, repeating for other probability distributions in the set to determine a combination of probability distributions giving highest overall probability for that class of targets, then repeating for at least one other class of targets and selecting the target class as being that which yields the highest overall occurrence probability.

11. Apparatus for recognising a radar target according to claim 10 characterised in that the HMM means is arranged to select probability distributions for successive feature vectors on the basis of some transitions between distributions allocated to successive feature vectors-being allowed for the class of targets and others being forbidden.

12. Apparatus for recognising a radar target according to claim 11 characterised in that the HMM means is arranged to undergo a preliminary training procedure in which parameters for the states or probability distributions and transition probabilities are produced by deriving Doppler feature vectors for training data obtained from known classes of targets and calculating the mean and variance of vectors corresponding to like targets or target classes.

13. Apparatus for recognising a radar target according to claim 12 characterised in that the HMM training procedure includes a plurality of cycles through state sequences.

14. Apparatus for recognising a radar target according to claim 8 characterised in that it is arranged to encompass targets within a single range cell.

* * * * *